United States Patent [19]

Neil

[11] Patent Number: 5,541,944

[45] Date of Patent: Jul. 30, 1996

[54] APPARATUS AND METHOD FOR COMPENSATING FOR ELECTRON BEAM EMITTANCE IN SYNCHRONIZING LIGHT SOURCES

[75] Inventor: George R. Neil, Williamsburg, Va.

[73] Assignee: Southeastern Universities Research Association, Newport News, Va.

[21] Appl. No.: 225,151

[22] Filed: Apr. 8, 1994

[51] Int. Cl.$^6$ ........................................................... H01S 3/00
[52] U.S. Cl. ................................................. 372/2; 372/20
[58] Field of Search ............................... 372/2, 20, 69

[56] References Cited

U.S. PATENT DOCUMENTS

| | | | |
|---|---|---|---|
| 4,466,101 | 8/1984 | Schoen | 372/2 |
| 4,538,275 | 8/1985 | Szu | 372/2 |
| 4,570,103 | 2/1986 | Schoen | 372/2 |
| 4,809,281 | 2/1989 | Neil et al. | 372/2 |

*Primary Examiner*—Leon Scott, Jr.

[57] ABSTRACT

A focused optical beam is used to change the path length of the core electrons in electron light sources thereby boosting their efficiency of conversion of electron beam energy to light. Both coherent light in the free electron laser and incoherent light in the synchrotron is boosted by this technique. By changing the path length of the core electrons by the proper amount, the core electrons are caused to stay in phase with the electrons in the outer distribution of the electron beam. This increases the fraction of the electron beam energy that is converted to light thereby improving the efficiency of conversion of energy to light and therefore boosting the power output of the free electron laser and synchrotron.

14 Claims, 3 Drawing Sheets

APPARATUS AND METHOD FOR COMPENSATING FOR ELECTRON BEAM EMITTANCE IN SYNCHRONIZING LIGHT SOURCES

The United States may have certain rights to this invention, under Management and Operating Contract DE-AC05-84ER40150 from the United States Department of Energy.

FIELD OF THE INVENTION

This invention relates to a method and apparatus for improving the production of light output in electron light sources, including both synchrotron light sources and free electron lasers.

BACKGROUND OF THE INVENTION

A free electron laser (FEL) emits coherent light. A synchrotron emits incoherent light. Coherent light is produced in the FEL by wiggling the electron beam back and forth many times by a device called the wiggler, which contains a sinusoidal or helical magnetic field. In the process of oscillating back and forth, the electron radiates away some of its energy. Coherence is caused when the oscillations of the electrons are physically coherent, or in phase, with each other.

In the synchrotron, light is produced by bending an electron beam with one or a few magnetic fields, but the light does not have any feedback mechanism on itself, so it does not become coherent.

Part of the limitation in the output of a free electron laser or a synchrotron is caused by the fact that the radiating electrons do not all have the same longitudinal or transverse energy. In the process of going through a wiggler or around a synchrotron magnet, the electrons begin radiating light out of phase with each other, and eventually they get so out of phase that they can no longer effectively radiate any of their energy. This is caused by the fact that the electron beam in the FEL or synchrotron is not a purely monochromatic electron beam. The beam has variations in the average energy, including both a longitudinal and transverse energy, which causes the electromagnetic waves that are produced to interfere with each other, thereby reducing their intensity.

This invention involves compensating for this variation in longitudinal and transverse energy by taking the electrons which would normally arrive at the output end of the device earlier and giving them a longer path through the process, so that they then remain in phase with the electrons that are naturally taking a longer path through the device. The electrons therefore remain in phase for a longer period of time, allowing them to emit more of their energy and light, and permitting the device to become more efficient in the production of light.

This invention is a method and apparatus to compensate for the varying path lengths of the relativistic electrons in the FEL to boost the output of coherent light or in a synchrotron to boost the incoherent light. In the wiggler, the electrons that take the shortest path lengths are the ones in the center of the distribution, and the ones near the outside edge take a longer path length. This invention proposes the introduction of an optical beam, or electromagnetic wave, near the axis of the FEL or synchrotron electron beam to cause the electrons in the center of the beam to oscillate at a higher rate than those away from the center of the beam. The optical beam is made by a laser, typically a $CO_2$ laser or a neodymium yag laser, with very intense fields and with the electric field vector pointing transversely.

The addition of the optical beam would cause the electrons in the center of the distribution to oscillate at a higher rate than those in the outer part of the distribution. The net effect would be that the electrons in the center now have a longer path length in going through the wiggler than they would have if the electromagnetic wave were absent. As a result of the added optical beam, the electrons tend to remain in optical phase for a longer period of time as they pass through the wiggler and therefore more of their energy can be extracted in going through the wiggler. This results in higher amounts of light being produced and therefore a brighter optical beam from the FEL or synchrotron.

Synchrotron light sources and free electron lasers are very popular for the production of electromagnetic radiation in the full wavelength range. They're used for both scientific and commercial purposes. One potential application of the FEL or synchrotron is in exposing photo resist masks in the production of semiconductors. Free electron lasers also offer great potential in chemical production as a result of their ability to produce high average power at tunable wavelengths. The FEL may be tuned to a wavelength that causes a particular chemical species to resonate and forces specific bonds to break allowing the FEL to be used to drive a chemical reaction in a certain direction that it would not normally take.

Free electron lasers also offer increased performance in cutting and ablating applications as a result of the higher average power of the FEL, the higher efficiency that makes the FEL a more cost effective source, and the ability to tune to specific shorter wavelengths which would enhance the absorption of light on the surface of the material that is being acted upon.

An FEL or synchrotron also holds promise in medical imaging such as imaging tumors. The ability to tune the device permits choosing a wavelength that the tumor containing tissue is transparent to, allowing a very clear picture of the tumor. In this manner a tumor may be viewed in a non-invasive way and can be repeated on a regular basis to monitor the progress of therapies.

One of the limitations to these devices is the fact that the quality of the electron beam has a major effect on their performance. Part of the limitation in the output of these devices is caused by the fact that the electrons that are radiating light energy do not all have the same longitudinal or transverse energy. In the process of going through the wiggler or around the synchrotron magnet, they begin radiating light out of phase with each other, and eventually they get so out of phase that they can no longer effectively radiate any of their energy.

The sensitivity of FEL gain to the electron beam energy spread and emittance is a major limitation especially when wavelengths in the DUV to soft X-ray region are considered. At such short wavelengths the beam emittance and/or energy spread becomes a limiting factor in the performance of most practical devices. Many designs have resorted to very long wigglers or very high peak currents in a MOPA configuration to achieve the required gain since mirrors have limited reflectivity in this region. Early proposals to improve the FEL acceptance for such situations worked with dispersed electrons and involved wiggler modifications to introduce a gradient in the wiggler resonant field. Recent work by A. M. Sessler, D. H. Whittum, and Li-Hua Yu, as reported on page 309, Volume 68 (1992), of Physics Review Letters involves modifications of the electron beam momentum distribution by means of a FODO channel and accelerator cavities operating on the $TM_{210}$ mode to establish a correlation between energy and amplitude of transverse oscillations. These suggestions have shown the potential to reduce demands on the accelerator energy and on wiggler length with concomitant cost savings. This invention proposes a different approach to accomplish a similar goal, that is reduce the negative impact of transverse motion of electrons in a wiggler. Sessler et al's suggestion was to have the electrons on the outside of the distribution have higher energy so as to better maintain coherence whereas this invention involves slowing down the core electrons to achieve better coherence.

U.S. Pat. No. 4,748,629 provides for an FEL where time delay is used to phase lock the device to produce phase correlations between laser pulses.

U.S. Pat. No. 4,742,522 shows an FEL with precorrecting an output beam for phase aberrations by passing a low powered beam through the same path as a high powered beam and then phase-conjugating the beam and injecting it into the amplifier at the same time as an output pulse from the laser.

U.S. Pat. No. 4,845,718 shows the suppression of unwanted sidebands in FEL laser pulses by introducing a time dispersion of the sideband to cause a time lag between the main wavelength and the sideband.

None of the aforementioned patents teach the novelty of this invention, specifically the addition of an optical beam to change the path length of the core electrons of the FEL or synchrotron to boost their power output and efficiency.

SUMMARY OF THE INVENTION

This invention consists of the addition of an optical beam focused on the center of the distribution of electrons in a FEL or synchrotron to change the path length of the core electrons and therefore cause them to remain in phase with the electrons in the outer part of the distribution. The net effect is a boost in the power and efficiency of the FEL or synchrotron.

This invention proposes reducing the negative impact of the transverse motion of electrons, or reducing emittance sensitivity, as they pass through the wiggler of a FEL or synchrotron. The idea of reducing emittance sensitivity is based on the realization that phase coherence is lost because electrons which spend most time nearest the core are ahead of others after passing through some length of the wiggler. This invention proposes slowing down the relativistic energy, $\gamma_z$, for the core electrons. This is accomplished by copropagating with the core electrons a non-resonant optical beam of high intensity. By providing a radial profile to the non-resonant optical beam, the core electrons are wiggled more strongly than those on the outer edges of the distribution and they therefore take a longer path and are slightly retarded in phase and therefore remain in resonance longer in terms of the parallel gamma. This increases gain and effectively decreases the influence of emittance.

The matching of the phase of the core electrons with the outer electrons can be calculated in terms of $\gamma_{11}$, the standard relativistic factor but projected onto the z (propagation) axis:

$$\lambda_s = |\lambda_w / 2\gamma_{11}^2| \text{ where } \gamma_{11}^2 = \gamma_0^2 /(1+K^2+ \ldots)$$

Where $\lambda_s$ is the FEL wavelength and $\lambda_w$ is the wiggler wavelength. Typically terms other than $K^2$ are ignored. K is a function of offset from the axis; finite emittance requires a radial profile to the electron density. For a linear wiggler with infinite planes oriented with the field in the y direction:

$$\gamma_{11}^2 = \gamma_0^2/(1+(K^2/2))|1+(k_w^2 y^2/2)|$$

The result of the finite emittance of the electron beam is a variation on the order of 0.1% to 1% in the effective $K^2$ over the beam radius leading eventually to a phase mismatch across the beam. The phase slip is:

$$d\psi/dz = k_w - (k_s/2\gamma^2)(1+K^2 - 2\alpha_w \alpha_s \cos\Psi + \gamma^2 \beta_\perp^2 + \alpha_{s1}^2)$$

The new term $\alpha_{s1}^2$ represents the addition of a new optical wave. The magnitude of $\alpha_{s1}^2$ off axis will be decreased to compensate for the increase in $K^2$. This effect is occurring in a non resonant way, i.e., there is no particular restriction on the frequency relationship between the lasing wavelength and the new wave. In practice it is desired to have $\omega_s$ greater than or less than $\omega_{s1}$, but such that many oscillators occur in a betatron period. $\alpha_{s1}^2$ is $(eE_{s1})/(mc^2 k_{s1})$. As an engineering formula for Gaussian beams $\alpha_{s1}^2 = 1.4 \times 10^{-15} \lambda_{s1} P/R_{L1}$. For resonant electrons at $\Psi=0$ (a constant wiggler):

$$\Delta v = 2\pi N |(2\Delta\gamma/\gamma) - (K^2 k_w^2 \gamma^2 \theta^2 + \alpha_{s1}^2)/(1+K^2)| \quad (1)$$

$$f(r) = \frac{e^{-r^2/2\bar{\tau}^2}}{2\pi\bar{\tau}^2} \quad f(\theta) = \frac{e^{-\theta^2/2\bar{\theta}^2}}{2\pi\bar{\theta}^2}$$

$$\Delta v_{beam} = 2\pi N \left[ 2 \frac{\partial\gamma}{\gamma} - \frac{K^2 k_\omega^2 \bar{\tau}^2 + 2\gamma^2 \bar{\theta}^2 + \alpha_{s1}^2}{1+K^2} \right] \quad (2)$$

For a matched beam, the first two terms in the numerator of the second term are equal, and In this case the phase slip refers to an average over the beam profile. Imagine now the effect of $\alpha_{s1}$ in Equation (1) remembering that both K and $\alpha_{s1}$ are functions of r. K increases off-axis and $\alpha_{s1}$ decreases off-axis. With a proper choice of radial profile the laser beam is maintained over a larger volume. It is helpful at this point to consider an example: an IR FEL. In this case $r_m=0.34$ mm, $\lambda=6$ cm, K $=1.76$. The emittance driven two terms are $4 \times 1^{-3}$ total. They represent an equivalent energy spread of $10^{-3}$. If a $10^{13}$ W, 1 μ laser on axis with $R_{L1}=1$ m is introduced then $\alpha_{s1}^2 = 1.4 \times 10^{-3}$ on axis and would therefore have a significant canceling effect.

OBJECTS AND ADVANTAGES

Accordingly, several objects and advantages of this invention are:

(1) to boost the light output in electron light sources including free electron lasers and synchrotrons, (2) to increase power output in a wide range of radiation sources from x-rays through microwaves in the electromagnetic spectrum, (3) to improve the efficiency of conversion of electron beam energy into electromagnetic radiation, and (4) to boost the power of FEL's and synchrotrons in the shorter wavelength regions, where presently there are very few commercial sources and none of them have the characteristics that are desired in a commercial system, such as high reliability, high average power, and long life.

DESCRIPTION OF THE INVENTION

A method and apparatus have been developed for increasing the power output of the free electron laser or synchrotron. A properly focused optical beam of the correct wavelength and frequency are used to modify the path length of the core electrons in a FEL or synchrotron electron beam. This changes the path length of the core electrons, allowing them to reach the output end of the laser in phase with the electrons on the outer periphery of the electron beam. By staying in the same phase, more coherent light is produced by the electrons, thus boosting the power and efficiency of the free electron laser. A schematic view of the overall system in the apparatus of the modified free electron laser of this invention is shown in FIG. 1.

Figure 1:
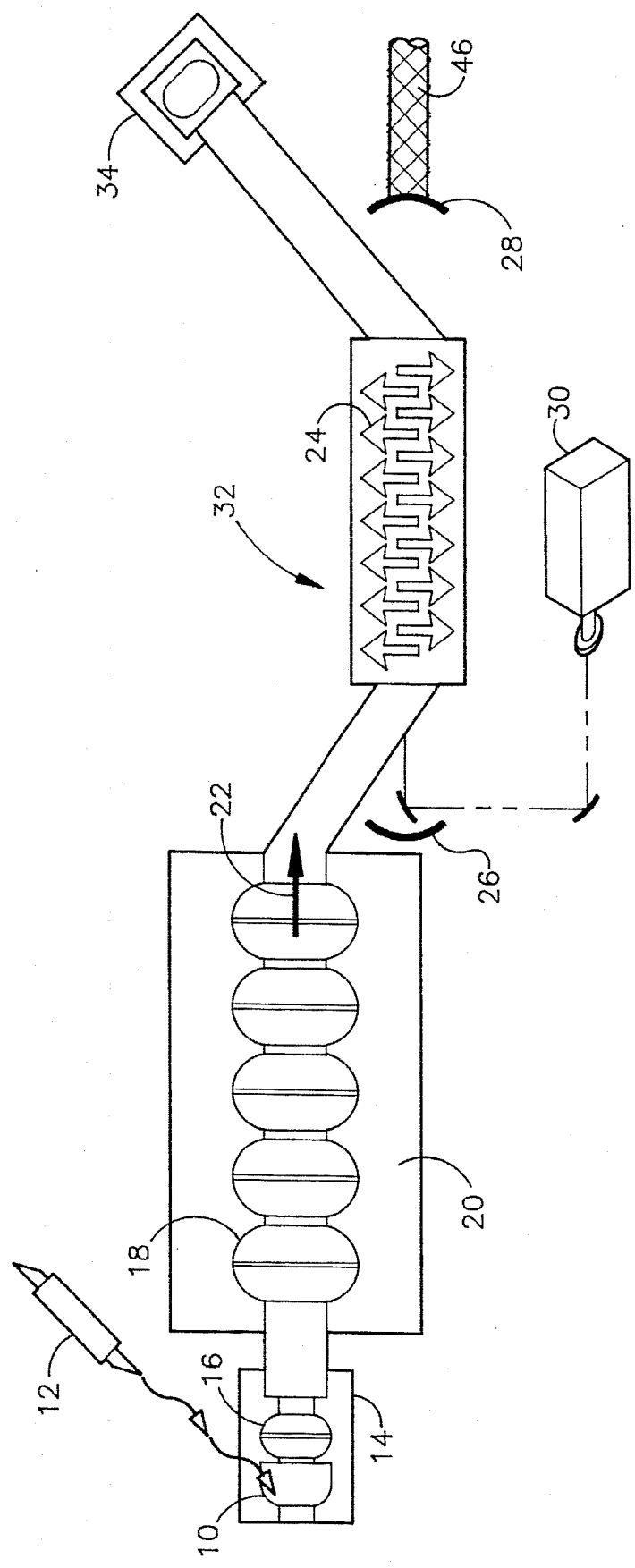
FIG. 1 is a schematic representation of the overall system in the apparatus of the free electron laser of this invention.

From the left to the right in FIG. 1 is shown the electron source laser 12 which produces a stream of free electrons by focusing light energy on a photocathode 14 in the gun 10 which typically is a thermionic cathode or a photo injector. The laser beam from laser 12 shines on the photocathode material to produce the original electrons at some elevated potential, for example, 100 Kilovolts above ground level, so that they are repelled from the photocathode surface.

A typical laser that may be used as the electron source laser would be a doubled neodymium yag laser, which produces green light. The green light of the electron source laser 12 acts upon preferably an alkaline metal such as cesium in the photocathode 14. The photocathode's cesium has a very low work function allowing electrons to be easily liberated from its surface.

Also shown in FIG. 1 is the preaccelerator 16, which employs radio frequency or microwave fields to bunch and focus the electrons to the proper dimensions for further acceleration. The preaccelerator performs the initial conditioning of the electron beam and brings the electron velocity closer to the speed of light. Once the electrons are sufficiently close to the speed of light, all the accelerator cavities after that can be identical. The initial acceleration in the preaccelerator includes cavities that are designed to match the electrons' gradually increasing velocity.

In the accelerator 20, microwave energy is used in a series of rf cavities 18, of which five are depicted in FIG. 1, to accelerate the electrons. The accelerator 20 consists of a series of microwave cells which are made out of a super conducting material. Radio frequency (rf) energy is introduced into these cavities, for example, typically the radio frequency energy may be at 1500 Megahertz. The rf, or microwave, cavities 18 support a resonant microwave field with an electric field vector which is in the direction that the electrons are traveling, so in moving through each cavity the electrons acquire energy from the microwave field. By the time the electrons reach the end of the accelerator, 20, they would have an energy typically in the range of 2 to 4,000 million electron volts (MeV). In FIG. 1 this is shown as the input electron beam 22.

The input electron beam 22 is the electron source for the free electron laser. As a microwave accelerator was used to accelerate these electrons, there would typically be a series of bunches of electrons in the input electron beam 22, perhaps a millimeter long, that are traveling very close to the speed of light. The average current might range from microamps up to even amps. On an average basis, the peak current might range from one amp up to a kiloamp or more, depending on the efficiency of the electron source that was initially used.

A magnetic field is then used to bend the input electron beam 22 into a device called a wiggler 24 or undulator. The wiggler 24 consists of a sinusoidal magnetic field which causes the electrons to oscillate back and forth in response to the magnetic field. Because they are relativistic, the electrons radiate energy when oscillating back and forth. As they are traveling very close to the speed of light, this radiated energy is shortened in wavelength. The resultant wavelengths are down proportional to a ratio of one over the square of the electron energy. At higher energies, shorter wavelengths are naturally produced from the electrons.

The radiated energy is preferably reflected back and forth between a set of mirrors, shown in FIG. 1 as the left side cavity mirror 26 and the right side cavity mirror 28, so it can feed back on itself and become coherent. At each end of the wiggler 24 in FIG. 1 are indicated schematically some mirrors which are coated to reflect the optical radiation.

The right side cavity mirror 28, or output mirror, is typically made slightly transmissive, allowing a small portion of the light energy to exit through the mirror surface and therefore be out-coupled. Other typical methods to out-couple some light energy would consist of scraping off a small portion of the light near the edge of the mirror or using some element that's positioned in the light beam inside the cavity to reflect a small portion of the light out of the cavity. The output light is shown in FIG. 1 as the output laser beam 46, which is the output of the free electron laser 32.

Once the electrons have converted some of their energy to light, they are disposed of. Typically, the electron beam is sent to a beam dump 34, shown at the top right of FIG. 1. The beam dump 34 is typically a cooled block of metal which stops the electrons and dissipates their energy in water. Typically the cooled block of metal is constructed of aluminum, although copper or graphite would also suffice.

The electrons dissipated in the beam dump 34 are wasted energy. In some cases these electrons are sent back through the accelerator again and their energy is recovered or else the electrons are reaccelerated so that the FEL becomes a more energy efficient device.

Figure 2:
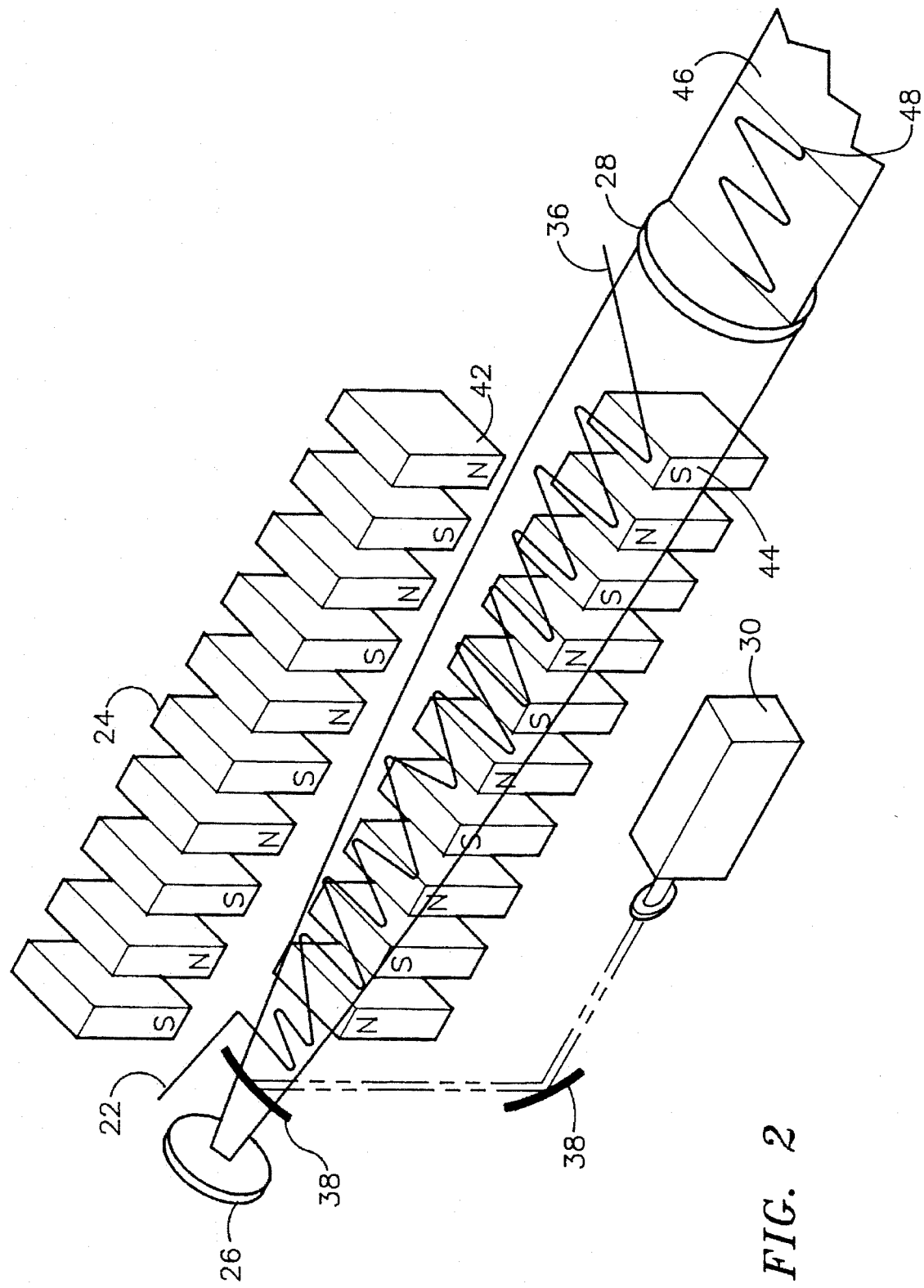
FIG. 2 is a schematic showing the free electron laser modified by the additional emittance compensation input in accordance with this invention.

FIG. 2 depicts the invention of this disclosure, which involves an additional laser 30 that is added to perform emittance compensation. This laser is typically a very high peak powered neodymium yag laser with mirrors 38 to direct its optical beam into the free electron laser optical cavity. The mirrors 38 are reflective to the frequency of the laser for compensating emittance 30 but are transparent to the frequency of the free electron laser. The free electron laser light therefore passes through any mirrors 38 that direct the emittance compensation laser beam into the region where the interaction takes place.

In FIG. 2 is shown the left side cavity mirror 26 on the upstream side of the free electron laser. This mirror 26 may also be called a laser resonator mirror and it is used to reflect the free electron laser radiation. It is known as the laser resonator mirror as it forms an optical resonator for the free electron laser allowing the electron beam to resonate back and forth. The optical beam bounces between the laser resonator mirror 26 on the upstream end of the wiggler 24 and the right side cavity mirror 28 or output mirror depicted on the downstream side of the wiggler 24.

Typically the laser resonator mirror 26 is a copper mirror that is coated with a substance such as silver to enhance its reflection. The laser resonator mirror 26 substance and coating are chosen to be reflective to the wavelength of the FEL. Typically one may also use multiple layers of dielectric materials to form very high reflection coatings.

After the laser resonator mirror 26 is shown the input electron beam 22 that has been produced by the accelerator which was shown in FIG. 1. The electron beam 22 from the accelerator is bent into the wiggler 24 by means of a magnetic field. The wiggler 24 device consists of an array of magnets. The example shown in FIG. 2 is a permanent magnet array, which consists of a series of North poles 42 and South poles 44 that produce a sinusoidal magnetic field on the axis. The sinusoidal magnetic field causes the electron beam 22 to oscillate. In the example shown in FIG. 2, the magnetic fields are alternately pointing up and down, and so the electron beam 22 is oscillating in the transverse dimension.

The oscillation is back and forth, and this is shown in FIG. 2 with the electron beam oscillating back and forth. The optical radiation then travels through the wiggler 24 and is shown in FIG. 2 as the output electron beam 36. The output electron beam 36 then contacts the right side cavity mirror 28 or output mirror which is also a laser resonator mirror. The output laser resonator mirror 28 would typically have a coating on it which is only partially reflective, so part of the light now can be out-coupled and used for whatever application is envisioned. The output lasersbeam 46 is shown exiting the right side cavity mirror 28 in FIG. 2. The electron beam, having given up some of its energy, is now sent to the beam dump, which has been shown in FIG. 1.

The electric field in the optical wave depicted in FIG. 2 is in the horizontal direction, and so it is therefore linearly polarized in a transverse direction.

Figure 3:
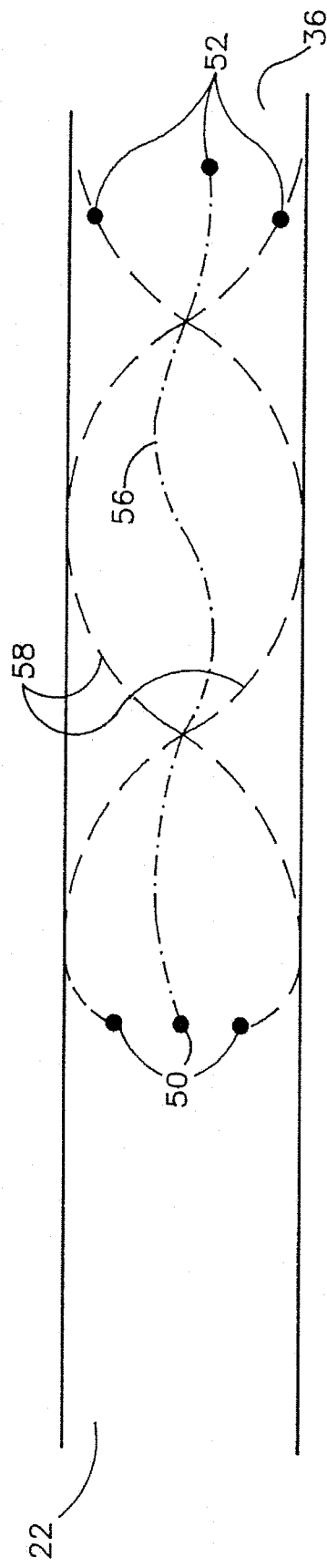
FIG. 3 shows the matched electron beam in the wiggler as presently used.

FIG. 3 shows one of the limitations in performance of the free electron laser, that is when you introduce the electrons to the wiggler, they are not all directed in a straight path down the wiggler. They have various trajectories, some of which are shorter, and others longer. As some are shorter and some are longer, the optical fields that they produce gradually get out of phase and the optical fields then interfere with each other. This reduces the amount of power that you can extract from the electrons. This is shown schematically in FIG. 3, depicting the input electron beam 22 having electrons 50 at the entrance to the wiggler in phase with each other. The electrons near the core of the FEL electron beam are depicted with a short path 56. The electrons in the outer distribution of the FEL electron beam are depicted with long paths 58. In a typical free electron laser as shown in FIG. 3, the electrons 52 are out of phase after traversing the wiggler. The output electron beam 36 therefore contains electrons, many of which are out of phase with each other.

Figure 4:
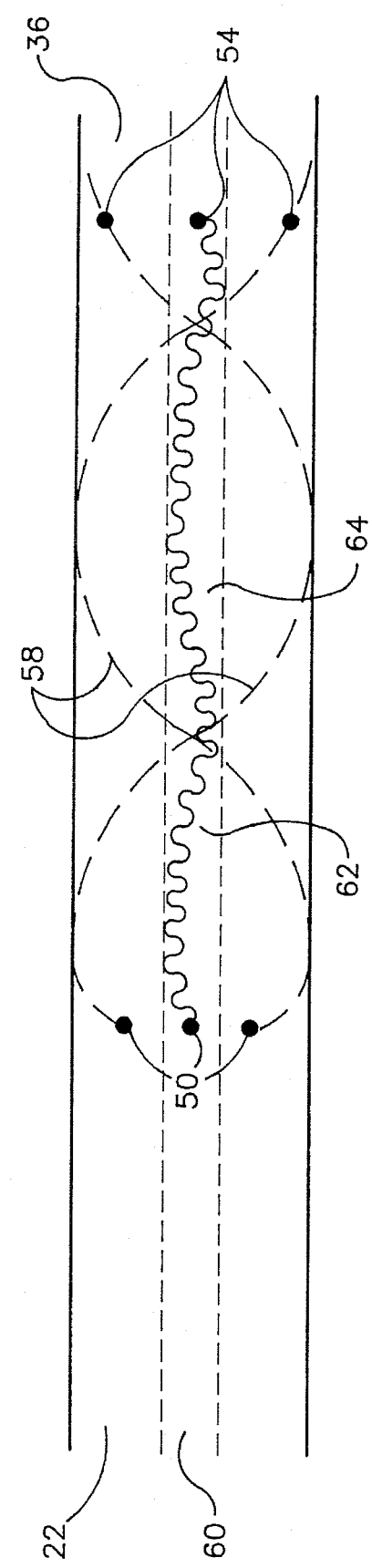
FIG. 4 is a view similar to FIG. 3, with the addition of the use of the present invention to cause the electrons to be in phase as they exit the wiggler.

FIG. 4 depicts the same FEL electron beam as depicted in FIG. 3, but with the addition of the method of this invention to compensate for the varying path lengths of the electrons. In the wiggler, the electrons that take the shortest path lengths are the ones in the center of the distribution, and the ones near the outside edge take a longer path length. This invention involves the introduction of an optical beam 60 near the axis for compensating emittance. The optical beam 60 is an electromagnetic wave, which typically would be made by a laser, for example a $CO_2$ laser or a neodymium yag laser. This laser would have very intense fields with the electric field vector pointing transversely. This would cause the electrons in the center of the distribution, to oscillate at a higher rate than in the wiggler or perhaps a lower rate. The net effect would be that the electrons in the center of the FEL electron beam have a longer path length in going through the wiggler than they would have if the electromagnetic wave were absent. As a result of the added electromagnetic wave, the electrons tend to remain in optical phase as they pass the wiggler for a longer period of time and therefore more of their energy can be extracted in going through the wiggler. This results in higher amounts of light being produced and therefore a brighter optical beam.

FIG. 4 therefore depicts the input electron beam 22, the electrons 50 in phase at the entrance to the wiggler, the long path 58 taken by the outer electrons which are unaffected by the added optical beam 60, and a modified path 62 taken by the core electrons which are affected by the added optical beam 60. The electrons 54 at the end of the wiggler are now in phase in FIG. 4, as opposed to being out of phase in the standard FEL depicted in FIG. 3. The output electron beam 36 is now capable of producing a higher output optical beam as a result of a greater proportion of the electrons being in phase.

Several examples for demonstrating this invention of lasers for compensating emittance follows. The first example demonstrates a free electron laser that is operating in the infrared region of the electromagnetic spectrum. In this example, for an injector that uses a photocathode to produce the electron beam, a doubled neodymium yag laser is used to produce green light. The green light is at about five watts of power on a photocathode which is made of cesiated gallium arsenide. The photocathode sits on a DC potential of 500 kilovolts (kv), so the electrons coming off acquire that energy. The electrons are then bunched and accelerated in the preaccelerator, bringing their energy from 500 kv up to 10 MeV of energy. The electron beam current for this would be as much as 5 milliamps in average current with a peak current much higher than that. The electrons are produced in a series of pulses at 25 MHz. The pulses are 2 picoseconds long and have 60 amps of peak current in the pulse. The electrons are then accelerated in a set of super conducting cavities. Typically as many as 16 cavities are employed to accelerate it up to 50 million electron volts of energy before bending it into the wiggler.

The wiggler is a device which has a 6 cm period, which means that the sinusoidal wavelength is 6 cm. The wiggler field is electromagnetic, produced on the order of 5 kilogauss of peak field, and there are typically 25 periods in the wiggler. In passing through the wiggler, the electrons produce light of approximately 4 microns in wavelength. In the single paths, they have a small single gain of about 40%. By positioning mirrors made of copper at each end of this, the light is reflected back and forth and amplified up to saturation. The peak power produced in one of the short pulses is on the order of 30 megawatts of peak power. The average power produced by 5 milliamps is on the order of 4 kilowatts of average power. The electron beam is then sent to a beam dump, where the remaining energy is dissipated in a cold block of aluminum.

For this example, a neodymium yag laser with a pulse length of 2 picoseconds is added for compensating emittance. The repetition rate of the light from the compensating emittance laser matches the repetition rate of the FEL electron beam. In this example it runs at 25 MHz, and the light pulses are on the order of 500 megawatts of peak power at a wavelength of 1.06 microns.

By adding the laser of this example for compensating emittance, a train of short optical pulses is introduced into the FEL cavity and combined with the train of short electron pulses as the electrons pass through the laser. By adding the emittance compensating laser of this example, the small signal gain would be increased from 40% to 60 or 80%, and this causes the output power in this particular example to be increased by 20 or 30%. So then instead of 5 kilowatts of average power there is between 6 and 7 kilowatts from the same device.

In order for the emittance compensating laser to accept only the core electrons, it is focused so that the diameter of the optical beam is smaller than the diameter of the electron beam. In this example, the radius of the electron beam is 250 microns. The radius of the optical beam is focused to less than that, 150 microns in radius at the center of the wiggler.

The optical beam that is introduced is typically in gaussian mode, which means the electric field has a gaussian distribution, so it falls off radially by e to the radius over the fundamental radius. Addition of the emittance compensating laser doesn't reduce the emittance but it diminishes the deleterious effects of the emittance. The output of the FEL is typically more efficient in the infrared region and so there is less improvement in the infrared region in this example than there is at shorter wavelengths. In the ultraviolet region of the spectrum, where the output is more sensitive to the emittance there is more improvement in the output.

A second example demonstrates a FEL operating in the ultraviolet region. This example uses the same injector source and an accelerator similar to example 1, but instead of accelerating to 50 MeV, the electrons are accelerated to 400 MeV. Sufficient energy exists that the FEL can operate in the ultraviolet region. It therefore is much more sensitive to the emittance of the electron beam. The electrons are introduced into the wiggler by again bending with a magnetic field. In this example the same wavelength wiggler is used as in example 1, that is a 6 cm wavelength, however because the gain is lower the length of the wiggler is increased from 1.5 meters, or 25 periods of wiggling, to double that. The wiggler length is therefore 3 meters and operates the FEL in the ultraviolet region. It contains 50 periods of wiggling. This accelerates the electrons at the exit of the wiggler to 500 MeV.

The mirrors in this example are made of a material that reflects the uv light and preferably are aluminum on a silicon carbide substrate. The aluminum is coated with a dielectric like silicon dioxide, to protect it from oxidation. Materials such as this have very high reflection in the uv range.

As a result of the higher energy imparted by the longer wiggler, the FEL in this example produces wavelengths of typically 200 nanometers (nm), or 0.2 microns, which is in the hard ultraviolet. In this region it's very much more sensitive to the emittance. Using the same laser for compensating emittance as in example 1 the 500 megawatt peak power at 1 micron is introduced into the wiggler. Because the uv light has a smaller transverse cross section, the compensating emittance laser beam is focused more tightly. The FEL electron beam is typically focused to a radius of 175 microns. Therefore, instead of having a 150 radius micron beam for the emittance compensating beam as in example 1, the beam is focused to 100 microns.

The efficiency improvement in example 2 is over a factor of 2.0 in potential gain. Although this is not a large number, it's important to understand that what is crucial in the operation of these lasers is the difference between a gain and a loss, and ultraviolet mirrors have a large amount of loss. For example, if a laser has a small single gain of 20%, and has a 7.5% loss per mirror, then there is a 20% gain but 15% loss, so only a net gain of 5% per pass is achieved. That means it takes a long time for the laser to build up to saturation. It also means that the laser doesn't saturate at a very high power.

By simply doubling this small signal gain, from 20% to 40% the net gain is increased from 5% to 25%, so the net gain is increased by a factor of 5 making a highly improved system. At the end of the process the electron beam is returned to an electron beam dump and its energy is dissipated as before.

The third example of the invention is an example of a synchrotron light source. The previous two examples were for free electron lasers. The difference is that free electron lasers emit coherent light, whereas synchrotrons emit incoherent light. The free electron laser gets its coherence by wiggling the electron beam back and forth many times in the wiggler, which has a sinusoidal or helical magnetic field. In the process of oscillating back and forth in the FEL, the electron radiates away some of its energy, and its coherence is caused by the fact that these oscillations are physically coherent with each other.

The synchrotron produces light from the bending of an electron beam due to a single magnetic field or perhaps several oscillations, but the light does not have any feedback mechanism on itself, so it does not become coherent and that has implications in terms of what kind of bend the light will have, whether the light rays can all be focused very tightly to a tight point.

A synchrotron generally consists of a storage ring, that recirculates the electron beam around and around. Rather than discard the electron beam at the end of the storage ring, a few acceleration cavities may be added. The cavities may be similar to the cavities that are used in the linear accelerator, but instead of a long series there are at most only 2 or 3 of the cavities. In the synchrotron, the cavities are to compensate for the energy that is lost by the electron beam traveling around the storage ring. The ring bends the electrons around using magnetic fields and it passes around and around, over and over again. Some of the rings have a very high average current, 0.10 amp or even 1.0 amp of average current, and this makes them very bright.

A free electron laser can be put on such a device but the third example is not to construct a laser. There are 4 undulations in this wiggler which wiggles the electrons back and forth but does not produce coherent light as in the previous two examples. A device so configured produces a spectrum of light that extends out to very short wavelengths. Typically the storage ring in a synchrotron runs at 1 billion electron volts in energy. At this energy level, even though a wiggler with a longer wavelength may be used, for example a 1 meter wavelength, the wavelengths coming out are in the soft x-ray region, down around 10 Angstroms. The intensity of this radiation is dependent upon how tightly the electron bunches follow the same trajectories through this undulator device in the same way that the performance of the FEL depends on how coherent the motion of the electrons are within the wiggler itself.

Example 3 therefore consists of a similar laser for compensating emittance, typically a neodymium yag laser with a 1 micron wavelength. It has high peak power, typically 500 Megawatts of peak power. Synchrotrons have longer pulse lengths of electrons as long as a nanosecond. The laser beam is set up to arrive in the undulator device at the same time as the optical wave, so the two arrive simultaneously. The electron beam, in going through the undulator, has a size set by its emittance, typically 200 microns in diameter. The optical beam is focused to typically 100 microns in diameter, and travels through the wiggler at the same time as the electrons. By virtue of the added optical beam, the electrons convert more of their energy into the higher harmonics of that wiggler field, allowing more power output at the 10 Angstrom wavelength than would be the case without the added optical beam. Typically in a synchrotron very small fractions of the electron beam energy are converted into light, but the addition of the optical beam for compensating emittance improves that performance by a factor of 5 or more.

While there has been shown and described several examples of the preferred embodiment of the present invention, it will be obvious to those skilled in the art that various changes and modifications may be made therein without departing from the scope of the invention as defined by the appended claims.

What is claimed is:

1. An apparatus for conditioning a beam of an electron driven radiation source, comprising:
    a source of a relativistic electron beam;
    a wiggler for receiving and undulating said electron beam, said electron beam having at any one time a distribution of outer electrons and central electrons and said wiggler converting part of the energy of said electron beam into electromagnetic radiation; and
    a source of conditioning electromagnetic radiation which is injected into said wiggler thereby undulating said central electrons to condition said central electrons to increase their path length such that said central electrons and said outer electrons exit said wiggler in substantially the same transverse plane.

2. The apparatus of claim 1 wherein said central electrons are caused to change path length by said source of conditioning electromagnetic radiation being injected primarily into said central electrons allowing said central electrons to remain in phase with said outer electrons and thereby increasing the amount of electromagnetic energy radiated by said electron distribution.

3. The apparatus of claim 1 wherein mirrors are inserted in the path of said electron beam at each end of said wiggler to cause said electron beam to feed back upon itself and become coherent.

4. The apparatus of claim 3 whereby at least one mirror is partially transparent to said electromagnetic radiation which contains an optical phase allowing a portion of the optical phase of said electromagnetic radiation to be out-coupled and thereby forming a free electron laser beam.

5. The apparatus of claim 4 whereby said free electron laser beam is tunable over a wide range of wavelengths including x-rays through microwave.

6. The apparatus of claim 1 wherein said source of an electron beam is a synchrotron.

7. The apparatus of claim 1 wherein said source of conditioning radiation is a laser focused to the correct diameter optical beam to change the path length of said central electrons but not affect the path length of said outer electrons in said electron beam.

8. The apparatus of claim 1 wherein said electron beam contains electrons that are brought to high potential by an accelerator.

9. The apparatus of claim 8 wherein said accelerator is either a storage ring or a linear accelerator.

10. The apparatus of claim 9 wherein said accelerator is a linear accelerator containing one to several rf cavities which support a resonant microwave field of energy with an electric field vector which is in the direction that the electrons are traveling thereby imparting energy to said electrons in said electron beam as they pass through said rf cavity.

11. The apparatus of claim 1 wherein the electrons in said electron beam exiting from said wiggler are sent to a beam dump which dissipates the energy of said electrons.

12. The apparatus of claim 1 wherein said source of an electron beam comprises:
    a photocathode; and
    a laser having a laser beam directed to said photocathode for producing a stream of free electrons.

13. The apparatus of claim 12 wherein said source of an electron beam further comprises a preaccelerator for bunching, focusing, and accelerating said free electrons.

14. A method for conditioning a beam of an electron driven radiation source which includes the following steps:
    providing a beam of relativistic electrons;
    providing a wiggler for receiving and undulating said electron beam, which electron beam has at any one time a distribution of outer electrons and central electrons;
    converting part of said electron beam by said wiggler into electromagnetic radiation; and
    injecting into said wiggler a conditioning electromagnetic radiation thereby undulating said central electrons to condition said central electrons to increase their path length such that said central electrons and said outer electrons exit said wiggler in substantially the same transverse plane.

\* \* \* \* \*